United States Patent [19]

Anderson et al.

[11] Patent Number: 4,818,898

[45] Date of Patent: Apr. 4, 1989

[54] OPTICAL NONLINEARITY IN ORGANIC AND ORGANOMETALLIC MOLECULES VIA LATTICE INCLUSION COMPLEXATION

[75] Inventors: Albert G. Anderson; David F. Eaton; Wilson Tam; Ying Wang, all of Wilmington, Del.

[73] Assignee: E. I. Du Pont de Nemours and Company, Wilmington, Del.

[21] Appl. No.: 905,907

[22] Filed: Sep. 10, 1986

[51] Int. Cl.⁴ .............................................. G02B 1/00
[52] U.S. Cl. .................................. 307/427; 372/22; 350/311; 252/600; 252/582
[58] Field of Search ............... 252/600, 582; 350/311; 307/427; 372/22

[56] References Cited

PUBLICATIONS

Franken, et al., Physical Review Letters, 7, 110-119 (1961).
Tomaru, et al., J. Chem. Soc. Chemical Communications, 1207-1208 (1984).
Wang, et al., Chemical Physics Letters, 120 441-444 (1985).
Nesmeyanov, et al., Doklady Chem., 221, 229-231 (1975).
Clement, et al., J. Chem. Soc. Chemical Communications, 654-655 (1974).
Bozak, et al., Chemistry Letters, 75-76 (1975).
Xing, G., "Bisthiourea Cadmium . . . ", Zhongguo Jiguang, vol. 14(5) 1987, pp. 302-308.
Kato, "High Efficiency High Power . . . in Urea", IEEE J. Quantum Electronics, vol. QE-16, No. 8, Aug. 1980.
Halbout, et al., "Efficient Phase-Matched SHG . . . Urea", IEEE J. Quantum Electronics, vol. QE-15, No. 10, Oct. 1979.
Cassidy, et al., "Nonlinear Optical Properties of Urea", Optics Communications, vol. 29, No. 2, May 1979, p. 243.
Betzler, et al., "Optical SHG in Organic Crystals: Urea and Ammonium-Malate", J. Mol. Structure 47 (1978) 393-396.
Harata, "The Structure of the Cyclodextrin Complex V", Bull. of Chem. Soc. Japan, vol. 50(6) 1416-1424 (1977).
Zyss, "New Organic Molecular Materials . . . ", J. Non-Cryst. Solids 47.2 (1982) 211-216.
Kurtz, et al., "A Powder Technique . . . ", J. Appl. Phys. 39, 8, July 1968, p. 3798.
Morrel, et al., "The Electro-Optic Coefficients of Urea", J. Chem. Phys. 71(12) Dec. 15, 1979, p. 5063.
Bauerle, et al. "Phase Matched SHG in Urea", Phys. Stat. Sol. (A) 42 (1977) K119.

Primary Examiner—Matthew A. Thexton
Assistant Examiner—Catherine S. Kilby

[57] ABSTRACT

There are disclosed a nonlinear optical element capable of second harmonic generation comprising a crystalline inclusion complex of a lattice-forming host compound crystallized with continuous channel cavities in the presence of a nonlinearly polarizable guest compound in a noncentrosymmetric space group, said guest compound having specified properties, and both said guest and host being selected from specified classes; a nonlinear optical device; a method of generating second harmonic radiation; and an electro-optic modulator.

18 Claims, 1 Drawing Sheet

FIG. 1
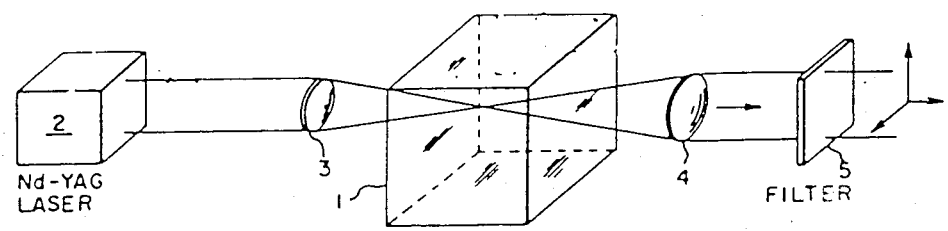
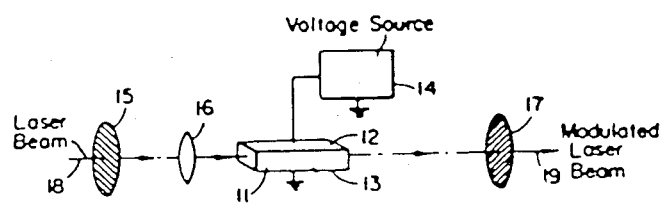
FIG. 2

OPTICAL NONLINEARITY IN ORGANIC AND ORGANOMETALLIC MOLECULES VIA LATTICE INCLUSION COMPLEXATION

BACKGROUND OF THE INVENTION

1. Field of the Invention

This invention relates to nonlinear optical systems, and particularly to organic and organometallic complexes capable of second harmonic generation (SHG) and having other useful nonlinear optical and electro-optic properties.

2. Description of Related Art

Nonlinear second order optical properties, such as second harmonic generation and the linear electrooptic effect, arise from the first nonlinear term, $\chi^{(2)}EE$, in the dipolar approximation of the polarization induced in a material by an applied electric field, E.

$$P(induced) = \chi^{(1)}E + \chi^{(2)}EE + \chi^{(3)}EEE + \ldots$$

The vector quantities P and E are related by tensor quantities $X^{(1)}, X^{(2)}, X^{(3)}\ldots$, where $X^{(1)}$ is the linear susceptibility, $X^{(2)}$ is the second order susceptibility which arises from the second order molecular hyperpolarizability, $X^{(3)}$ is the third order susceptibility which arises from further hyperpolarizabilities, etc. As tensor quantities, the susceptibilities, $X^{(i)}$, are highly symmetry dependent; odd order coefficients are nonvanishing for all materials but even order coefficients, e.g., $\chi^{(2)}$ which is responsible for SHG, are nonvanishing only for noncentrosymmetric materials.

Franken, et al., *Physical Review Letters*, 7, 118–119 (1961), disclose the observation of second harmonic generation (SHG) upon the projection of a pulsed ruby laser beam through crystalline quartz. The use of a laser remains the only practical way to generate an E large enough to be able to detect the SHG phenomenon.

Although a large number of organic and inorganic materials capable of SHG have been found, an intensive search continues for molecules which exhibit large hyperpolarizabilities, $\beta$. An organic molecule having a conjugated $\pi$-electron system or a low-lying charge transfer excited state often has an extremely large molecular hyperpolarizability, but unfavorable alignment in the crystalline phase can result in a centrosymmetric material in which $\chi^{(2)}$ vanishes. It is possible to circumvent this problem by using a chiral molecule to insure a rigorously noncentrosymmetric crystal, but problems associated with the creation and maintenance of a high level of optical purity limit the value of this approach. Moreover, optical activity does not guarantee that $X^{(2)}$ will be large, only that it will be nonzero.

Tomaru, et al., *J. Chem. Soc. Chemical Communications*, 1207–1208 (1984), disclose SHG in inclusion complexes between dimethyl $\beta$-cyclodextrin as a host molecule and a guest molecule chosen from p-nitroaniline, 2-hydroxy-4-nitroaniline and N-methyl-4-nitroaniline. The guests have a crystalline centrosymmetric geometry which is removed by formation of the inclusion complex.

Wang, et al., *Chemical Physics Letters*, 120, 441–444 (1985), disclose SHG with a crystalline 1:1 inclusion complex between p-nitroaniline and $\beta$-cyclodextrin (CD) as a host when exposed to the 1.06 $\mu$m output of a Nd-YAG laser. The authors also disclose SHG for CD inclusion complexes of other guests, specifically p-(N,N-dimethylamino)cinnamaldehyde, N-methyl-p-nitroaniline, 2-amino-5-nitropyridine and p-(dimethylamino)benzonitrile.

Cyclic inclusion complexes are those in which the host is a macrocyclic molecule characterized by a relatively large diameter hole in the center. Such compounds are known to include smaller molecules inside the cavity created by the interior void. A much larger class of inclusion complexes is the lattice inclusion complexes, in which the host co-crystallizes with the other material (guest) included within the lattice structure. These complexes are distinct from the cyclic inclusion complexes because for the former the region of the final crystalline structure in which the guest is located is defined by the voids created by the arrangement of host atoms in the unit cell of the host structure.

A useful review of the art relating to nonlinear properties of organic materials is given in *Nonlinear Optical Properties of Organic and Polymeric Materials*, D. J. Williams, ed., American Chemical Society, Washington, D.C. (1983). The structures, physical properties and applications of known inclusion compounds are reviewed in *Inclusion Compounds*, Atwood, et al., eds., Academic Press, London (1984). These publications do not disclose utility of lattice inclusion compounds for SHG.

Nesmeyanov, et al., *Doklady Chem.*, 221, 229–231 (1975), translated from *Doklady Akademii Nauk SSSR*, 221, 624–626 (1975), disclose the separation of metallocenes by inclusion compounds with thiourea. Specifically mentioned are the adducts with ferrocene, nickelocene, and cyclopentadienyltricarbonylmanganese.

Clement, et al., *J. Chem. Soc. Chemical Communications*, 654–655 (1974), disclose that ferrocene or mixtures of ferrocene and nickelocene form clathrates with thiourea. They report for the ferrocene adduct a molecular ratio of thiourea to ferrocene of 3.0 to 1. Bozak, et al., *Chemistry Letters*, 75–76 (1975), disclose the incorporation of cyclopentadienylmanganese tricarbonyl (cymantrene) into a ferrocene clathrate of thiourea when the ferrocene to cymantrene weight ratio is about 4:1.

The search continues for other useful material for SHG.

SUMMARY OF THE INVENTION

The present invention provides a nonlinear optical element capable of second harmonic generation, comprising a crystalline inclusion complex of a lattice-forming host compound crystallized with continuous channel cavities in the presence of a nonlinearly polarizable guest compound in a noncentrosymmetric space group, said guest compound
  (i) being nonlinearly polarizable in the presence of an electromagnetic field, and
  (ii) having a molecular width, W, such that $D/2 < W < D$, where D is the diameter of the channel cavity, wherein
    (A) the lattice-forming host compound is selected from
      (a) Hofmann clathrate lattice compounds having the formula $M^1(NH_3)_2Ni(CN)_4$ wherein $M^1$ is Mn, Ni, Cu or Cd;
      (b) Werner coordination complexes of a specified formula;
      (c) cyclophosphazenes;
      (d) tris-ortho-thymotide;
      (e) urea, thiourea and selenourea;

(f) phenols, hydroquinones and Dianin's compound;
(g) perhydrotriphenylene;
(h) cyclotriveratrylene;
(i) trianthranilides; and
(j) deoxycholic acid; and (B) the guest compound is selected from the group consisting of certain substituted aromatic compounds and octahedrally coordinated transition metal complexes having a -bonded ligand and a specified formula with the provisos that said inclusion complex is other than a complex of thiourea and benzene molybdenum tricarbonyl or a complex of tris-ortho-thymotide and stilbene chromium tricarbonyl, and when said nonlinear optical element is a single crystal, it is other than an inclusion complex of thiourea and cyclopentadienylmanganese tricarbonyl. The invention also provides a nonlinear optical device and an electro-optic modulator using as an optical element the nonlinear optical element of the invention, and a method of generating second harmonic radiation using said nonlinear optical element. In the device, method and modulator of the invention the optical element can also be a single crystal of an inclusion complex of thiourea and cyclopentadienylmanganese tricarbonyl.

BRIEF DESCRIPTION OF THE DRAWING

FIG. 1 is a plan view of a nonlinear optical device according to the invention.

FIG. 2 is a plan view of an electro-optic modulator of the invention.

DETAILED DESCRIPTION OF THE INVENTION

It has been found that lattice inclusion complexation can be used to induce optical nonlinearity in guest molecules whose crystals would not normally exhibit such nonlinearity because the crystals are centrosymmetric. The nonlinear optical element of the present invention comprises a host-guest inclusion complex of a particular lattice-forming host compound and a nonlinearly polarizable guest compound. As used herein the expression "lattice-forming host compound" means a compound which crystallizes in a crystal structure such that channel-like cavities are formed by the framework.

In the present invention the host-guest inclusion complex is a compound which crystallizes with continuous channel cavities in the presence of a nonlinearly polarizable guest compound in a noncentrosymmetric space group. Organometallic and inorganic lattice-forming host compounds which are suitable for the present invention are selected from:

(a) lattice compounds of the Hofmann-type (Hofmann) clathrates, $M^1(NH_3)_2Ni(CN)_4$ wherein $M^1$ is Mn, Ni, Cu or Cd;
(b) Werner coordination complexes having the formula $M^2X_2A_4$ wherein $M^2$ is divalent and is Fe, Co, Ni, Cu, Zn, Cd, Mn, Hg or Cr; X is $NCS^-$, $NCO^-$, $CN^-$, $NO_3^-$, $NO_2^-$, $Cl^-$, $Br^-$, or $I^-$; and A is substituted pyridine, α-arylalkylamine or isoquinoline;
(c) cyclophosphazenes. When Werner coordination complexes are used, suitable substituents for pyridine include hydrogen, linear or branched $C_1$-$C_6$ alkyl, $C_3$-$C_7$ cycloalkyl or phenyl groups, halogen, $C_1$-$C_6$ alkylamine groups and nitro groups. Suitable alkyl groups of the arylalkylamine are linear or branched primary $C_1$-$C_6$ alkyls. Suitable aryl groups of the arylalkylamine include phenyl and substituted phenyl, in which the substituents can be linear $C_1$-$C_6$ or branched $C_3$-$C_6$ alkyl, $C_3$-$C_7$ cycloalkyl, phenyl, halogen, $C_1$-$C_6$ alkylamino or nitro.

Organic lattice-forming host compounds suitable for use in the present invention are selected from
(a) tris-ortho-thymotide;
(b) urea, thiourea and selenourea;
(c) phenols, hydroquinones and Dianin's compound;
(d) perhydrotriphenylene;
(e) cyclotriveratrylene;
(f) trianthranilides; and
(g) deoxycholic acid.

Preferably, the lattice-forming host compound is tris-ortho-thymotide (TOT), a trianthranilide, cycloveratrylene, deoxycholic acid, urea, thiourea or selenourea; and most preferably, TOT, thiourea o deoxycholic acid.

For a given lattice-forming host compound set forth above, there is a range of sizes and shapes of guest molecules which can be accommodated. Some lattice-forming host compounds, e.g., urea, provide rigid channels with a narrow range of acceptable guest sizes. Other lattice-forming host compounds, e.g., the trianthranilides, TOT and the perhydrotriphenylenes, either have channels of different sizes in the same crystal structure or frameworks capable of expanding or contracting to incorporate a wider range of guest sizes. The approximate dimensions of the channels for many of the lattice-forming host compounds suitable for use in the present invention are given in *Inclusion Compounds*, Atwood, et al., eds., Academic Press, London (1984). This disclosure is incorporated herein by reference. Observed ranges of the width of channel cavities in the foregoing lattice-forming hosts when crystallized with a guest are given in Table 1 below.

TABLE 1

| HOST | WIDTH (Å) |
| --- | --- |
| Hofmann compounds | 7-9 |
| Werner complexes | 7-9 |
| Cyclophosphazenes | 5-10 |
| Hydroquinones, Dianin's compound | 2.6-3 (spherical radius) 6 |
| Urea | 5.2 |
| Thiourea | 6.1 |
| Perhydrotriphenylene | ~5 |
| Cyclotriveratrylene | ~5 |
| Trianthranilides | 5.5-9 |
| Deoxycholic acid | 4-6 |
| TOT | 4-6 |

It is to be understood that depending upon the guest the channel sizes can expand or contract slightly. As used herein the width or diameter of the channel is defined as the average of the diameters of the largest cylinder which can be accommodated within the channel and the smallest cylinder which can enclose the void space of the channel.

In the present invention, for a given channel size, the guest molecule is nonlinearly polarizable in the presence of an electromagnetic field and has a molecular width, W, such that $D/2 < W < D$, where D is the diameter of the channel. This geometric property insures that the guest molecules are small enough to fit into the channels of the lattice-forming host compound, but large enough to prevent the formation of paired head-to-tail dimers, which would be incapable of SHG. As used herein, "molecular width" and "molecular length" of a guest molecule can be estimated by building a molecular model of the molecule using commercially available kits, e.g. CPK space-filling or Dreiding stick models, and measuring the longest dimension (L) and the width (W) of the cylinder obtained by turning the model about the axis formed by L. The measurements are performed with a scale ruler calibrated according to the kit used. The dimensions of potential guest molecules can also be obtained from X-ray diffraction crystal structure data.

Guest molecules suitable for use in the present invention have a non-zero molecular second order polarizability ($\beta$). Molecules which exhibit a non-zero dipole moment change between the ground state and some of their excited states possess a non-zero molecular second order polarizabilities. Normal values of $\beta$, for materials which are linear in their response are about $10^{-30}$ esu (electrostatic units), whereas highly polarizable materials have a $\beta$ value of about $10^{-27}$ esu. In the present invention the guest molecule has second order polarizability greater than $10^{-30}$ esu.

In general, the molecular interaction by which the host-guest complexation is generated should exhibit directional selectivity for both guest and host to minimize orientational cancellation of bulk second order optical properties. Spectroscopic measurements can be employed to determine in each case whether anisotropic host-guest complexation occurs.

Guest compounds suitable for preparing a crystalline inclusion complex for nonlinear optical elements of the invention are selected from the group consisting of (a) substituted aromatic compounds of the formula

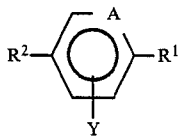

wherein
A is C or N;
$R^1$ is $-NH_2$, $-NHCH_3$, $-N(CH_3)_2$, or $-C(O)M-(CO)_x$ where M is Mn or Re and x is 5 or M is Co and x is 4;
$R^2$ is $-NO_2$, $-CN$, $-(CH=CH)_nC(O)H$ where n is 1 to 3, or 4-(dicyanomethylene)-2-methyl-6-vinyl-4H-pyran; and
Y is $-H$, $-CH_3$, $-OCH_3$, $-OH$, $-F$ or Cl; and (b) octahedrally coordinated transition metal complexes having a 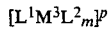-bonded ligand and having the formula $[L^1M^3L^2_m]^p$ wherein
$M^3$ is Cr, Mo, W, Mn, Tc, Re, Fe, Ru, Os, Rh, or Ir;
$L^1$ is an olefinic or aromatic ligand capable of -bonding to $M^3$ to form part of an octahedral complex;
each $L^2$ is independently an unidentate ligand;
m is 1-3 and is the total number of unidentate ligands, $L^2$; and
p is $-1$, 0 or $+1$; with the proviso that said inclusion complex is other than a complex of thiourea and benzene molybdenum tricarbonyl or a complex of tris-ortho-thymotide and stilbene chromium tricarbonyl. Single crystals of an inclusion complex of thiourea and cyclopentadienylmanganese tricarbonyl are not included within the scope of the nonlinear optical elements of the invention but are within the other embodiments of the invention. When p is $\pm 1$, the transition metal complex is associated with appropriate counter ions. Suitable anions include $BF_4^-$, $PF_6^-$, halides, $ClO_4^-$, $NO_3^-$ and $SbF_6^-$. Suitable cations include alkali metal ions, $N(CH_3)_4^+$, tetraethyl ammonium ion, and tetramethyl phosphonium ion.

Preferably, $M^3$ is Cr, Re, Fe or Mn. Preferably, $L^1$ is selected from the group consisting of substituted and unsubstituted benzenes, naphthalene, indene, substituted and unsubstituted cyclic and acyclic 1,3 dienes, cyclopentadiene and substituted cyclopentadienes, and trimethylene methane. Preferably, $L^2$ is $-CO$, $-CS$, $-SCN$, $-NO$, or $-CN$; most preferably $-CO$. When the guest compound is an octahedrally coordinated transition metal complex, the lattice forming host compound is preferably TOT or thiourea.

When the guest compound is a substituted aromatic compound as specified above, preferred embodiments of the invention are $R^1$ is $-N(CH_3)_2$ or $-C(O)Mn(CO)_5$, $R^2$ is $-CN$, $-CH=CHC(O)H$ or 4-(dicyanomethylene)-2-methyl-6-vinyl-4H-pyran, and the lattice host compound is TOT or deoxycholic acid. Preferably A is C and Y is H.

The inclusion complexes used in the present invention can be prepared by a process comprising adding the guest compound, optionally dissolved in a suitable solvent, to a solution of the lattice-forming host compound dissolved in a suitable solvent, mixing the resulting combination, heating if necessary to effect complete dissolution, filtering the resulting solution and forming crystals of the desired product by cooling the filtered solution or slowly evaporating the solvent. Suitable solvents include water and volatile organic solvents such as alcohols, ethers, aromatic hydrocarbons and chlorinated hydrocarbons. The actual solvent used will depend upon the guest and host compounds. Methanol and ethanol are preferred solvents. Dissolution of the host and guest compound is effected at a temperature of from about 20° C. to about 100° C., preferably about 20° C. to about 65° C. To effect crystallization of the inclusion complex, the filtered solution is generally cooled to about $-30°$ C. to about 0° C.

The nonlinear optical device of the invention comprises means to direct at least one incident beam of electromagnetic radiation into an optical element having nonlinear optical properties whereby electromagnetic radiation emerging from said element contains at least one frequency different from the frequency of any incident beam of radiation, said different frequency being an even multiple of the frequency of one incident beam of electromagnetic radiation; said optical element comprising a crystalline inclusion complex of a lattice-forming host compound crystallized with continuous channel cavities in the presence of a nonlinearly polarizable compound in a noncentrosymmetric space group, said guest compound
(i) being nonlinearly polarizable in the presence of an electromagnetic field, and (ii) having a molecular width, W, such that $D/2 < W < D$, where D is the diameter of the channel cavity; wherein the lattice-forming host compound and guest compound are selected as set forth earlier herein for the nonlinear optical element of the invention, but the inclusion complex can also be a single crystal of an inclusion complex of thiourea and cyclopentadienylmanganese tricarbonyl.

Preferably, the emerging radiation of a different frequency is doubled (second order) (SHG). Preferably, the electromagnetic radiation is radiation from one of a number of common lasers, such as Nd-YAG, semiconductor diode, and Ar or Kr ion. Referring now to FIG. 1, optical element 1 is oriented in one of a potentially infinite number of crystal orientations which achieve partially maximized SHG conversion by virtue of phase matching. The specific orientation is chosen for reasons of noncriticality, maximum nonlinearity, increased angular acceptance, etc. Polarized light of wavelength 1.06 $\mu$ from Nd-YAG laser 2 is incident on the optical element along the optical path. A lens 3 focuses the light into the optical element. Light emerging from the optical element 1 is collimated by a similar lens 4 and passed through a filter 5 adapted to remove light of wavelength 1.06 $\mu$ while passing light of wavelength 0.53 $\mu$.

Optical element 1 is preferably a single crystal having at least one dimension of about 0.5 mm or greater but can be substantially smaller crystals imbedded in a film of polymer. The smaller crystals can be randomly orientated or aligned with the same orientation, and are preferably aligned. For the smaller crystals, if their size is small enough to prevent light scattering, they can be dispersed in the polymeric binder and pressed, molded or shaped into an optically clear element capable of SHG. The polymer binder should be chosen to be a non-solvent for the inclusion complex. For larger crystallites, similar elements can be prepared if the binder used has an index of refraction matched to the complex, so as to prevent light scatter and remain transparent.

It will be further apparent to those skilled in the art that the optical elements of the invention are useful in other devices utilizing their nonlinear properties, such as sum and difference frequency mixing, parametric oscillation and amplification, and the electro-optic effect. The use of crystals having nonlinear optical properties in optical devices is known in the art, as shown by U.S. Pat. Nos. 3,747,022, 3,328,723, 3,262,058 and 3,949,323.

The electro-optic modulator of the invention comprises means to direct a coherent beam into an optical element, and means to apply an electric field to said element in a direction to modify transmission property of said beam, said optical element meeting the description given above for the optical element for the nonlinear optical device of the invention. The preferred optical elements for the nonlinear optical device and electro-optic modulator of the invention are those embodiments set forth earlier herein for the nonlinear optical element, and also a single crystal of an inclusion complex of thiourea and cyclopentadienylmanagnese tricarbonyl.

Referring now to FIG. 2, an electro-optic modulator embodying the invention utilizes optical element 11. A pair of electrodes 12 and 13 are attached to the upper and lower surfaces of the element 11, across which a modulating electric field is applied from a conventional voltage source 14. Optical element 11 is placed between polarizers 15 and 17. A light beam 18, such as that from as Nd-YAG laser, is polarized by polarizer 15, focused on the optical element 11, propagated through the crystal or crystals and subjected to modulation by the electric field. The modulated light beam is led out through analyzer polarizer 17. Linearly polarized light traversing element 11 is rendered elliptically polarized by action of the applied modulating voltage. Polarizer 17 renders the polarization linear again. Application of the modulating voltage alters the birefringence of element 11 and consequently the ellipticity impressed on the beam. Polarizer 17 then passes a greater or lesser fraction of the light beam as more or less of the elliptically polarized light projects onto its nonblocking polarization direction.

It is understood that the invention has been described with reference to preferred embodiments thereof and that variations are to be included within the scope of the invention. Furthermore, frequency or phase modulation of the light beam by the modulator is possible, although the embodiment specifically described performs intensity modulation.

The invention is further illustrated by the following examples in which all percentages and parts are by weight and temperatures are in degrees Cesius, unless otherwise stated. All of the complexes illustrated in the Examples have a guest with size requirements and polarizabilities as set forth herein, and the complexes crystallize in noncentrosymmetric space groups with channel cavities.

Experimental Procedure for Measuring SHG

Unless otherwise stated SHG was measured by the powder method of Kurtz, et al., *J. Appl. Phys.* 39, 3798 (1968), using a Nd YAG laser ($\lambda = 1.064$ $\mu$m) and urea as a reference. The polycrystalline urea powder used as a reference had an average particle size of 90 $\mu$m to 125 $\mu$m. The intensity of the second harmonic radiation generated by each sample tested was thus measured relative to that provided by urea.

General Procedures

The following preparative procedures were used in the Examples as indicated:
A. About 200–500 mg of a selected organometallic complex were added to about 10–20 mL of a 50% saturated solution of thiourea in methanol. The resulting mixture was heated if necessary to dissolve the organometallic complex; and the resulting solution was filtered under pressure. The filtered solution was cooled to about 0° to $-20°$ whereby crystals formed.
B. Thiourea and the selected organometallic complex in a molar ratio of about 3:1 were dissolved in methanol and then the methanol was evaporated under reduced pressure causing formation of solid. The resulting solid product isolated from this procedure provided material suitable for SHG measurements but not for X-ray diffraction analyses.
C. A mixture of about 150 mg of TOT in about 50 mL of methanol was heated until the TOT dissolved, and the resulting solution was cooled to ambient temperature, about 25°. About 150 mg of the selected guest compound were added to the TOT/methanol solution, and the resulting mixture was heated if necessary to dissolve the guest compound. The resulting solution was filtered under pressure and then the methanol was evaporated slowly at ambient temperature.

EXAMPLE 1

Thiourea (4 g) was added to a solution of 0.5 g of benzene chromium tricarbonyl in 50 mL of methanol in a round-bottom flask, and the resulting mixture was heated at about 30° and swirled until the thiourea dissolved. Then the methanol was evaporated under reduced pressure to cause the formation of a crystalline product, which was removed from the flask and washed with petroleum ether until the washings were colorless to give 4.47 g of light yellow needles as product.

Procedure A was used with 15 mL of thiourea solution and 250 mg of benzene chromium tricarbonyl. After keeping the resulting solution of product at 0° for two days, yellow needles were isolated: mp=158°-170° (decomp.). IR(KBr): 1948s, 1892m, 1879s, 1848w, 1632w, 1615m, 1490w cm$^{-1}$.

Another sample of the thiourea/benzene chromium tricarbonyl inclusion complex was prepared according to Procedure A as described above. Anal: Calcd. for $C_{12}H_{18}CrN_6O_3S_3$: C, 32.57; H, 4.10; Cr, 11.75. Found: C, 32.72; H 4.18; Cr, 11.29. Results of SHG measurements on the materials prepared in this Example are presented in Table 2.

EXAMPLE 2

Procedure A was used with 15 mL of thiourea solution and 250 mg of fluorobenzene chromium tricarbonyl. The chromium complex was dissolved without heating; and then the resulting solution was cooled first to −1° and next to about −20° to give yellow needles of the inclusion complex which were separated by hand from crystals of thiourea. IR(KBr): 1958vs, 1932w, 1892vs, 1632s, 1489m, 1461m cm$^{-1}$. Anal.: Calcd. for $C_{12}H_{17}CrFN_6O_3S_3$: C, 31.30; H, 3.72; Cr, 11.29. Found: C, 31.13; H, 3.88; Cr, 11.13. SHG results are presented in Table 2.

EXAMPLE 3

Procedure B was used with 100 mg of cyclopentadienylrhenium tricarbonyl and 100 mg of thiourea in 15 mL of methanol. SHG results are presented in Table 2.

EXAMPLE 4

Procedure A was used with 250 mg of 1,3-cyclohexadiene iron tricarbonyl and 15 mL of thiourea solution. Light yellow needles were isolated as product. IR(KBr): 2043s, 1964s, 1957sh, 1613s cm$^{-1}$. Anal.: Calcd. for $C_{12}H_{20}FeN_6O_3S_3$: C, 32.15; H, 4.50; Fe, 12.46. Found: C, 32.01; H, 4.47; Fe, 12.60. SHG results are presented in Table 2.

EXAMPLE 5

Procedure A was used with 400 mg of cyclohexadienylmanganese tricarbonyl and 15 mL of thiourea solution. After maintaining the resulting solution of product at −20° for two days, crystals were isolated. IR(KBr): 2006s, 1945sh, 1931s, 1919s, 1633w, 1615s cm$^{-1}$. Anal Calcd. for $C_{12}H_{19}MnN_6O_3S_3$: C, 32.28; H, 4.29; Mn, 12.31. Found: C, 32.11; H, 4.43; Mn, 12.68.

Procedure B was also used to prepare the inclusion complex from 50 mg of cyclohexadienylmanganese tricarbonyl and 50 mg of thiourea in 10 mL of methanol. SHG results are presented in Table 2.

EXAMPLE 6

Procedure A was used with 300 mg of trimethylenemethane iron tricarbonyl and 15 mL of thiourea solution. The resulting solution was cooled to −18° overnight to yield long, thin, off-white needles of the inclusion complex which were isolated. Another sample of the complex was prepared using a similar procedure. IR(KBr): 2060m, 1986s, 1613s cm$^{-1}$. Anal : Calcd. for $C_{10}H_{18}FeN_6O_3S_3$: C, 28.44; H, 4.30; Fe, 13.22. Found: C, 28.36; H, 4.33; Fe, 12.79. SHG results are presented in Table 2.

EXAMPLE 7

Thiourea (4.0 g) was added to a solution of 0.5 g of cyclopentadienylmanganese tricarbonyl dissolved in 50 mL of methanol. The resulting mixture was heated to 30° to dissolve the thiourea; the methanol was removed under reduced pressure to give solid product which was washed with petroleum ether to yield 4.42 g of pale yellow crystals. SHG results are presented in Table 2.

This inclusion complex was also prepared using Procedure A with 500 mg of cyclopentadienylmanganese tricarbonyl and 10 mL of thiourea solution. The resulting solution was maintained at 0° for about 4 days to give 230 mg of crystals which were washed with methanol and dried under nitrogen. IR(KBr): 2012s, 2006sh, 1954w, 1928vs, 1634w, 1616s, 1490w cm$^{-1}$. Anal Calcd. for $C_{11}H_{17}MnN_6O_3S_3$: C, 30.55; H, 3.96; Mn, 12.70. Found: C, 30.74; H, 4.25; Mn, 10.80.

EXAMPLE 8

Procedure A was used with 400 mg of butadieneiron tricarbonyl and 10 mL of thiourea solution. The resulting solution was maintained at −15° for two days to give crystals which were isolated, washed with methanol and dried under n to yield 129 mg of product. SHG results are presented in Table 2. The material turned white when left standing for a period of at least a week, thereby suggesting that the organometallic compound may be coming out of the inclusion complex.

EXAMPLE 9

Procedure B was used with 100 mg of pyrroylmanganese tricarbonyl and 100 mg of thiourea in 15 mL of methanol to give a yellow solution from which the inclusion complex was isolated. SHG results are given in Table 2.

EXAMPLE 10

Procedure A was used with 400 mg of cyclopentadienylchromium dicarbonyl nitrosyl and 15 mL of thiourea solution. The resulting solution was maintained at 0° for two weeks to yield fiber-like needles which were isolated. IR(KBr): 2019sh, 2010.88s, 1941m, 1700m, 1615s cm$^{-1}$. Anal.: Calcd. for $C_{10}H_{17}CrN_7O_3S_3$: C, 27.84; H, 3.97; Cr, 12.05. Found: C, 27.80; H, 3.95; Cr, 12.30. SHG results are given in Table 2.

EXAMPLE 11

TOT (150 mg) was dissolved in 50 mL of boiling methanol. The resulting solution was cooled to ambient temperature, about 25°, decanted into a solution of 200 mg of p-dimethylaminocinnamaldehyde in 10 mL of methanol. The resulting product solution was maintained at 0° for 6 days to give yellow rhomboid crystals which were isolated to yield 90 mg of product (mp=217°–218°). Procedure C was used with 200 mg of p-dimethylaminocinnamaldehyde. Solvent was evaporated from the resulting solution to give the product. The ratio of host to guest was determined by X-ray crystallography. Anal.: Calcd. for $C_{77}H_{85}NO_{13}$: C, 75.03; H, 6.95. Found: C, 74.81; H, 6.82. SHG results are given in Table 3.

EXAMPLE 12

Procedure C was used with 150 mg of dimethylaminobenzonitrile. Solvent was evaporated from the resulting solution to give white crystals which were isolated to yield 90 mg of product. Duplicate elemental analyses for C (74.91, 74.66) and H (6.56, 6.56) are consistent with both a host guest ratio of 1:1 calculated for $C_{42}H_{46}N_2O_6$ (C, 74.75; H, 6.87) and 2:1 calculated for $C_{75}H_{82}O_{12}N_2$ (C, 74.88; H, 6.87). SHG results are given in Table 3.

EXAMPLE 13

TOT (50 mg) was dissolved in 15 mL of boiling methanol to give a solution which was cooled to ambient temperature and then filtered into a flask containing 100 mg of p-cyanobenzoyl manganese pentacarbonyl. From the resulting solution yellow needles, which probably contained an excess of the organometallic complex, were isolated.

In a separate experiment, using Procedure C with 150 mg of TOT and 150 mg of the organometallic complex, thin white needles were isolated. SHG results are presented in Table 3.

EXAMPLE 14

Procedure C was used with 250 mg of indane-chromium tricarbonyl to yield 157 mg of product. IR(KBr): 1958s, 1874s, 1765m, 1269w, 1257w, 1219m, 1092m. Anal.: Calcd. for $C_{45}H_{46}CrO_9$: C, 69.04 H; 5.92. Found: C, 68.97; H, 5.71. SHG results are presented in Table 3.

EXAMPLE 15

A solution of 50 mg of TOT in 15 mL of methanol was added to 58 mg of methoxybenzene chromium tricarbonyl to give a solution from which the methanol was evaporated to obtain a light yellow crystalline product.

In a separate experiment, Procedure C was used with 250 mg of the organometallic complex to give 62 mg of the same product. SHG results are given in Table 3.

EXAMPLE 16

Procedure C was used with 300 mg of 1,2,3,4-tetrahydronaphthalene chromium tricarbonyl. Some solvent was evaporated from the resulting solution to give yellow needles. SHG results are given in Table 3.

EXAMPLE 17

Procedure C was used with 300 mg of (benzenemanganese tricarbonyl)tetrafluoroborate. Some solvent was evaporated from the resulting solution to give needles of the organometallic starting material and block-like crystals of the inclusion complex. SHG results are given in Table 3.

TABLE 2
Inclusion Complexes of Thiourea

| Example | Host:Guest Ratio | SHG (Rel. to urea) |
|---|---|---|
| 1 | 3:1 | 0.8–2.25 |
| 2 | 3:1 | 2 |
| 3 | (a) | 0.5 |
| 4 | 3:1 | 0.4 |
| 5 | 3:1 | 0.4 |
| 6 | 3:1 | 0.3 |
| 7 | 3:1 | 0.25–0.3 |
| 8 | (a) | 1.0 |
| 9 | (a) | 0.2 |
| 10 | 3:1 | 0.1 |

(a) No elemental analysis was obtained

TABLE 3
Inclusion Complexes of Tris-ortho-thymotide

| Example | Host:Guest Ratio | SHG (Rel. to urea) |
|---|---|---|
| 11 | 2:1 (b) | 0.6–1.0 |
| 12 | (c) | 0.25 |
| 13 | (a) | 0.2 |
| 14 | 1:1 | 0.1 |
| 15 | (a) | 0.1 |
| 16 | 1:1 | 0.1 |
| 17 | (a) (b) | 0.1 |

(a) Elemental analysis was not obtained.
(b) Host:guest ratio determined by X-ray diffraction.
(c) Host:guest ratio cannot be determined by C,H analysis.

EXAMPLE 18

Deoxycholic acid (400 mg) and 200 mg of p-nitroaniline were dissolved in 40 mL of ethanol. The resulting solution was filtered under pressure and the solvent evaporated. The resulting solid was removed by filtration, rinsed with cold methanol (2 mL) and dried under reduced pressure to give 365 mg of a yellow product. The product gave a SHG of 1.0 relative to urea.

EXAMPLE 19

Deoxycholic acid (1 g) in 5 mL of heated ethanol was added to 0.1 g of 4-(dicyanomethylene)-2-methyl-6-(p-dimethylaminostyryl)-4H-pyran in 5 mL of heated ethanol. The resulting mixture was filtered and the filtrate was allowed to cool to ambient temperature. After the filtered solution was maintained at ambient temperature overnight, it was filtered under pressure, and then the solvent was evaporated to give the product which displayed a SHG of 0.13–0.38 relative to urea.

The Invention Being Claimed Is:

1. A nonlinear optical element capable of second harmonic generation, comprising a crystalline inclusion complex of a lattice-forming host compound crystallized with continuous channel cavities in the presence of a nonlinearly polarizable guest compound in a noncentrosymmetric space group, said guest compound
(i) being nonlinearly polarizable in the presence of an electromagnetic field, and
(ii) having a molecular width, W, such that $D/2 < W < D$, where D is the diameter of the channel cavity;
wherein
(A) the lattice-forming host compound is selected from the group consisting of
(a) Hofmann clathrate lattice compounds having the formula $M^1(NH_3)_2Ni(CN)_4$ wherein $M^1$ is Mn, Ni, Cu or Cd;

(b) Werner coordination complexes having the formula $M^2X_2A_4$ wherein $M^2$ is divalent and is Fe, Co, Ni, Cu, Zn, Cd, Mn, Hg or Cr; X is $NCS^-$, $NCO^-$, $CN^-$, $NO_3^-$, $NO_2^-$, $Cl^{31}$, $Br^-$, or $I^-$; and A is substituted pyridine, α-arylalkylamine or isoquinoline;

(c) cyclophosphazenes;
(d) tris-ortho-thymotide;
(e) urea, thiourea and selenourea;
(f) phenols, hydroquinones and Dianin's compound;
(g) perhydrotriphenylene;
(h) cyclotriveratrylene;
(i) trianthranilides; and
(j) deoxycholic acid; and (B) the guest compound is selected from the group consisting of (a) substituted aromatic compounds of the formula

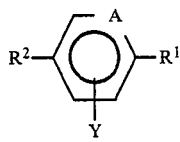

wherein
A is C or N;
$R^1$ is $-NH_2$, $-NHCH_3$, $-N(CH_3)_2$, or $-C(O)M(CO)_x$ where M is Mn or Re and x is 5 or M is Co and x is 4;
$R^2$ is $-NO_2$, $-CN$, $(CH=CH)_nC(O)H$ where n is 1 to 3, or 4-(dicyanomethylene)-2-methyl-6-vinyl-4H-pyran; and
Y is $-H$, $-CH_3$, $-OCH_3$, $-OH$, $-F$ or Cl; and (b) octahedrally coordinated transition metal complexes having a -bonded ligand and having the formula $[L^1M^3L^2_m]^p$ wherein
$M^3$ is Cr, Mo, W, Mn, Tc, Re, Fe, Ru, Os, Rh or Ir;
$L^1$ is an olefinic or aromatic ligand capable of -bonding to $M^3$ to form a part of an octahedral complex;
each $L^2$ is independently an unidentate ligand;
m is 1-3; and
p is $-1$, 0 or $+1$; with the provisos that said inclusion complex is other than a complex of thiourea and benzene molybdenum tricarbonyl or a complex of tris-ortho-thymotide and stilbene chromium tricarbonyl, and when said nonlinear optical element is a single crystal, it is other than an inclusion complex of thiourea and cyclopentadienylmanganese tricarbonyl.

2. A nonlinear optical element according to claim 1 wherein the lattice-forming host compound is selected from the group consisting of
(a) tris-ortho-thymotide;
(b) urea, thiourea and selenourea;
(c) phenols, hydroquinones and Dianin's compound;
(d) perhydrotriphenylene;
(e) cyclotriveratrylene;
(f) trianthranilides; and
(g) deoxycholic acid.

3. A nonlinear optical element according to claim 2 wherein the guest compound is an octahedrally coordinated transition metal complex having a -bonded ligand.

4. A nonlinear optical element according to claim 3 wherein the host compound is tris-ortho-thymotide, a trianthranilide, cycloveratrylene, deoxycholic acid, urea, thiourea or seleonurea.

5. A nonlinear optical element according to claim 4 wherein $L^1$ is selected from the group consisting of substituted and unsubstituted benzenes, naphthalene, indene, substituted and unsubstituted cyclic and acylic 1,3 dienes, cyclopentadiene and substituted cyclopentadienes, and trimethylene methane.

6. A nonlinear optical element according to claim 5 wherein each $L^2$ is independently $-CO$, $-CS$, $-SCN$, $-NO$ or $-CN$.

7. A nonlinear optical element according to claim 6 wherein the host compound is thiourea or tris-ortho-thymotide.

8. A nonlinear optical element according to claim 7 wherein $M^3$ is Cr, Re, Fe or Mn.

9. A nonlinear optical element according to claim 8 wherein $L^2$ is CO.

10. A nonlinear optical element according to claim 2 wherein the guest compound is a substituted aromatic compound.

11. A nonlinear optical element according to claim 10 wherein the host compound is tris-ortho-thymotide or deoxycholic acid.

12. A nonlinear optical element, according to claim 11 wherein A is C.

13. A nonlinear optical element according to claim 12 wherein Y is H.

14. A nonlinear optical element according to claim 13 wherein $R^1$ is $-N(CH_3)_2$.

15. A nonlinear optical element according to claim 14 wherein $R^2$ is $-CN$ and the host is tris-ortho-thymotide.

16. A nonlinear optical element according to claim 14 wherein $R^2$ is $-CH=CHC(O)H$ and the host is tris-ortho-thymotide.

17. A nonlinear optical element according to claim 13 wherein $R^1$ is $-C(O)Mn(CO)_5$ and the host is tris-ortho-thymotide.

18. A nonlinear optical element according to claim 14 wherein $R^2$ is 4-(dicyanomethylene)-2-methyl-6-vinyl-4H-pyran and the host is deoxycholic acid.

* * * * *